United States Patent

[11] 3,556,217

[72] Inventors Anastasiu and Vasile Eugeniu;
 Traian Margarit, Bucharest, Rumania
[21] Appl. No. 846,474
[22] Filed July 31, 1969
[45] Patented Jan. 19, 1971
[73] Assignee I.P.C.U.P. Institutul pentru Proiectare si Cercetare pentru Utilaj Petrolier Bucharest, Rumania

[54] DEVICE FOR WEDGING THE PACKER IN WELLS
 8 Claims, 2 Drawing Figs.
[52] U.S. Cl. ................................................ 166/217
[51] Int. Cl. ................................................ E21b 23/00
[50] Field of Search ................................ 166/206, 187, 217

[56] References Cited
UNITED STATES PATENTS

| | | | |
|---|---|---|---|
| 2,652,894 | 9/1953 | Brown et al. | 166/206 |
| 2,991,833 | 7/1961 | Brown et al. | 166/187 |
| 3,035,639 | 5/1962 | Brown et al. | 166/187 |

Primary Examiner—James A. Leppink
Attorney—Waters, Roditi, Schwartz, & Nissen

ABSTRACT: A wedging device of a packer is constituted by an annular rubber member on the outer surface of which are secured circumferentially spaced slip members with external teeth while on the inner surface there are secured circumferentially spaced elements with tapered inner surfaces cooperatively defining a tapered bore. A conical member extends in the bore and can be inserted more deeply therein to expand the wedging device and cause the teeth to engage the inner surface of a surrounding well casing.

DEVICE FOR WEDGING THE PACKER IN WELLS

BRIEF SUMMARY OF THE INVENTION

This invention relates to a system used for elastically wedging a packer in wells and concomitantly for limiting the wedging stress of the packer in the well.

It is known to mount packer slips used for being secured in the well, on an annular rubber member, which slips at the moment the slips are engaged over an elastic gasket used for sealing the annular space.

This system presents the shortcoming of a complicated construction, which combines the packer sealing action with that of wedging and setting without being able to ensure the uniform shifting of the slips, this eventually leading to a nonuniform and excessive compression of a part of the sealing gasket, or of the elastic rubber member placed under the slips thereby resulting in an inadequate setting of the packer. At the same time, it can cause rubber extrusion and the destruction of the sealing element, in case an overstressing arises during the wedging action.

It is an object of the invention to eliminate these shortcomings by mounting the setting slips on the outer surface of an elastic rubber member with adhesive and vulcanization while on the inner surface there is similarly mounted circumferentially spaced elements with tapered surfaces cooperatively defining a conical bore in which is freely received a conical member, which, by penetrating into the bore, causes expansion of the wedging assembly constituted by the slips, the circumferentially spaced elements and the elastic rubber member. The expansion stroke of the slips and their pressing force on the casing is limited by an adjustable sleeve threadably engaged on the conical member for contacting the wedging assembly which limits displacement of the conical member.

DETAILED DESCRIPTION

Figure 1:
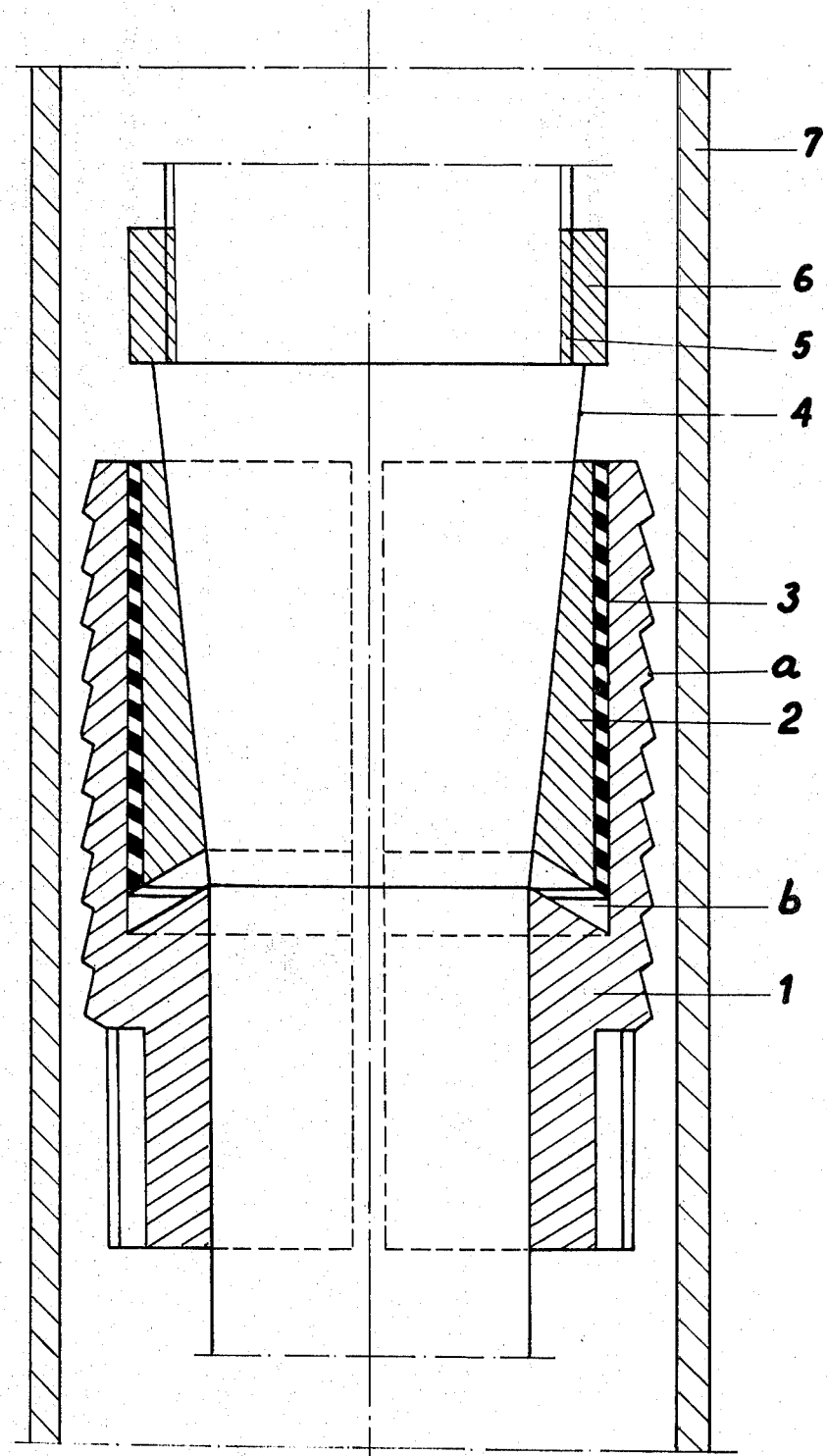
FIG. 1 is a longitudinal cross section taken through the wedging device, with the slips retracted.
Figure 2:
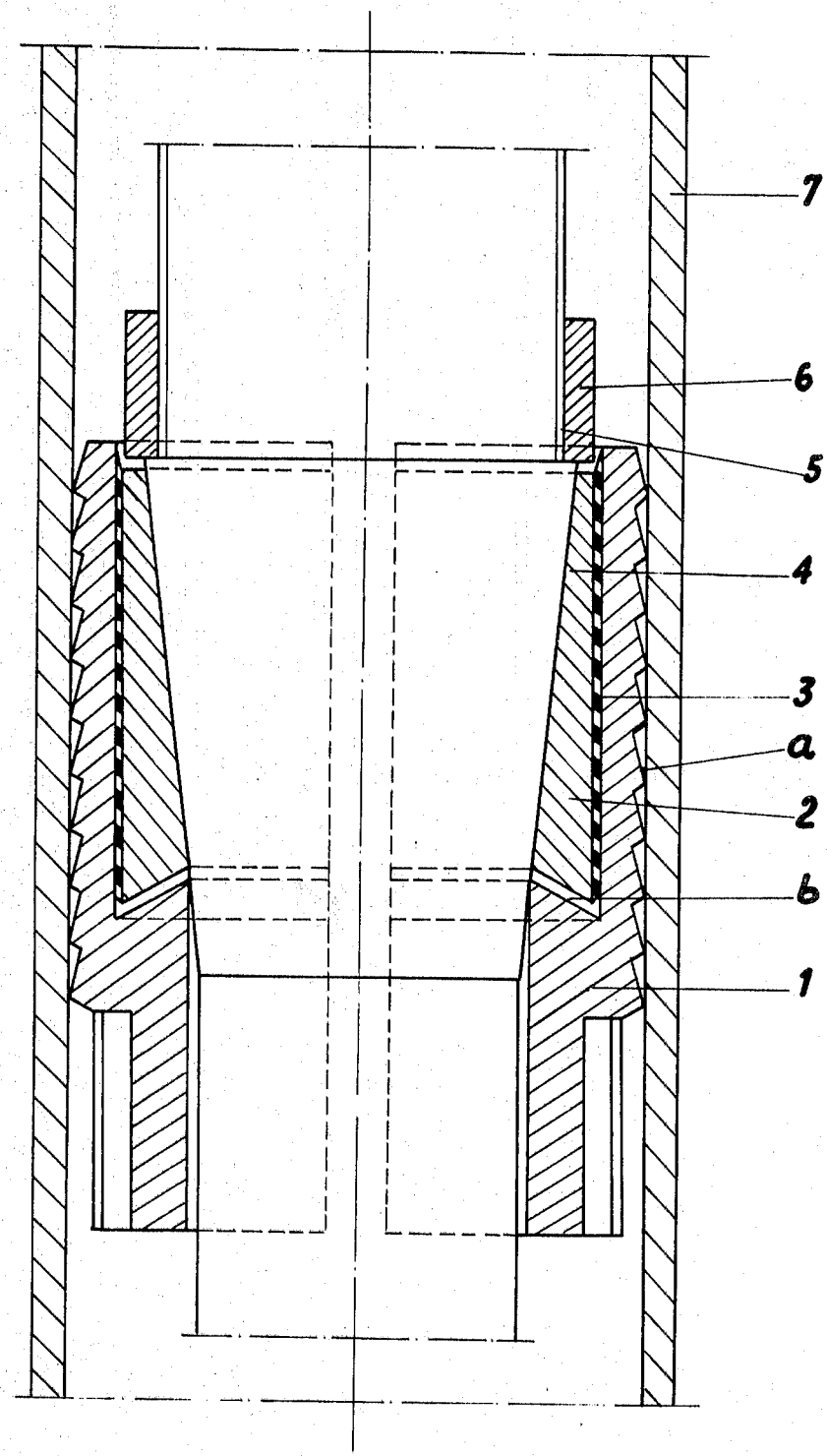
FIG. 2 is a longitudinal cross section taken through the wedging device, with the slips fixed on the casing.

The device is constituted of a number of settable steel slips 1 secured on the outer surface of an annular, elastic member 3 made of rubber or the like, and a number of elements 2 secured to the inner surface of member 3. The slips 1 and elements 3 are respectively arranged around the elastic member 3 in circumferentially spaced relation to enable expansion of member 3 and outward movement of slips 1 and elements 3. The slips 1 are provided with external teeth $a$ shaped to wedge against a surrounding casing wall 7 when the packer is installed therein. The slips 1 have conical shoulders facing elements 3 to define a recess $b$ therebetween in the uninstalled position shown in FIG. 1. The elastic rubber layer 3 has a thickness and elasticity corresponding to the working conditions imposed on the packer as will be explained later.

The securing of the rubber member 3 to the inner faces of the slips 1 and to the outer faces of the elements 2 is effected by an adhesive and vulcanization.

The elements 2 have a certain degree of independent longitudinal displacement in relation to the slips 1 limited by the rubber thickness and the value of its elasticity.

The elements 2 have tapered internal surfaces which cooperatively define a conical bore and a truncated conical member 4 is mounted in the bore for longitudinal displacement therein.

The conical member 4 has an upward cylindrical terminal portion 5 on which is threadably attached a limiting sleeve 6, which can be axially displaced along the cylindrical portion 5, and fixed by means of a suitable locking system (not shown).

In order to secure the packer at a desired depth in the well, the conical member is longitudinally displaced downwardly in FIG. 1, while the assembly of member 3, slips 1 and elements 2 is held at a given level in the casing by known means (not shown). The wedging assembly constituted by the slips 1, the elements 2 and the elastic rubber member 3 is outwardly displaced due to the penetration of the member 4 in the bore formed by the elements 2. Due to the elastic rubber layer 3, the engagement of teeth $a$ with the casing is elastically and progressively achieved. The expansion force of the conical member 4 is limited by adjusting the position of the sleeve 6 on the portion 5, to limit the maximum depth of penetration of conical member 4 in the bore of the elements 2. The sleeve 6 is aligned with elements 2 to contact the same in the lowered position of sleeve 6.

In the event that the elastic rubber member 3 is torn and separated from slips 1 or elements 2 due either to an inadequate adjustment of the position of sleeve 6, or due to some manufacturing defect, wedging is nevertheless obtained by means of engagement of the lower conical surfaces of elements 2 with the transvers conical shoulders of the slips 1 at the bottom of recess $b$.

In the event that the downward longitudinal displacement of the conical member 4 takes place over a great length due to misplacement of sleeve 6, the lateral expansion of the slips is elastically stopped by the deformation of the elastic rubber member 3, which allows the teeth $a$ of slips 1 to slide downwardly along the well casing, the specific pressure developed by the slips on the casing remaining constant.

The device as described above has the following advantages:

1. It ensures an elastic setting of the slips on the casing walls;
2. It limits the specific pressure of the slips upon the casing walls; and
3. It protects the casing and packer against overstressing.

We claim:

1. A packing device adapted for being wedged in a well casing, said device comprising an annular elastic member having inner and outer surfaces, a plurality of slip members secured to the outer surface of said annular elastic member and arranged therearound in circumferentially spaced relation, said slip members having an external surface for engaging the inner surface of a well casing, a plurality of elements secured to the inner surface of the annular elastic member and arranged therearound in circumferentially spaced relation, the latter elements having tapered internal surfaces which cooperatively define a conical bore, and a displaceable conical member in said bore engaging said elements to urge the same outwardly, when forced deeper therein, to cause the slip members to move outwardly and engage the casing.

2. A device as claimed in claim 1, wherein said slip members include teeth on the external surfaces thereof.

3. A device as claimed in claim 1, wherein said slip members have transverse shoulders facing said elements for limiting displacement thereof relative to said slip members.

4. A device as claimed in claim 3, wherein said shoulders are inclined with respect to the axis of said bore.

5. A device as claimed in claim 1, wherein said conical member includes a terminal cylindrical portion and an axially adjustable sleeve on said cylindrical portion for limiting the depth of penetration of the conical member in said bore.

6. A device as claimed in claim 5, wherein said sleeve is threaded on said cylindrical portion.

7. A device as claimed in claim 5, wherein said sleeve is positioned in alignment with said elements.

8. A device as claimed in claim 1, wherein said elastic member is secured to said slip members and said elements by an adhesive and vulcanization.